(12) United States Patent
Vogel

(10) Patent No.: US 6,939,214 B2
(45) Date of Patent: Sep. 6, 2005

(54) HONING WHEEL HAVING INTERNAL GEARING

(75) Inventor: Hans-Juergen Vogel, Haspelmoor (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 10/424,265

(22) Filed: Apr. 28, 2003

(65) Prior Publication Data

US 2003/0220062 A1 Nov. 27, 2003

(30) Foreign Application Priority Data

May 3, 2002 (DE) .................................... 202 07 016 U

(51) Int. Cl.[7] .................................................. B24D 1/00
(52) U.S. Cl. ........................ 451/541; 451/358; 451/359; 451/508
(58) Field of Search ................................ 451/541, 358, 451/359, 360, 508

(56) References Cited

U.S. PATENT DOCUMENTS

| | | | | |
|---|---|---|---|---|
| 5,085,014 A | * | 2/1992 | Sandhof | 451/51 |
| 5,371,978 A | * | 12/1994 | Higashikawa | 451/51 |
| 5,482,498 A | * | 1/1996 | Higashikawa | 451/61 |
| 5,800,252 A | * | 9/1998 | Hyatt | 451/61 |
| 5,941,764 A | * | 8/1999 | Yang | 451/358 |
| 6,220,937 B1 | * | 4/2001 | Wirz | 451/47 |
| 6,273,801 B1 | * | 8/2001 | Rappold | 451/253 |
| 6,371,837 B1 | * | 4/2002 | Luedeke | 451/57 |
| 6,402,605 B1 | * | 6/2002 | Christiansen et al. | 451/540 |
| 6,805,620 B2 | * | 10/2004 | Iwai et al. | 451/219 |

OTHER PUBLICATIONS

Gleason Brochure, "*ZH 250 CNC Gear Honing Machine*", The Gleason Works, Rochester, NY, Jul. 1996.

* cited by examiner

*Primary Examiner*—Lee D. Wilson
*Assistant Examiner*—Anthony Ojini
(74) *Attorney, Agent, or Firm*—Robert L. McDowell

(57) ABSTRACT

The cross-sectional profile of the outer peripheral surface of a honing wheel is within a spherical enveloping surface that is concentric with the honing wheel. Due to the cross-sectional profile of the outer peripheral surface of the honing wheel, tilting in the opening of the tool head is reliably prevented. Even if the honing wheel is tilted during installation or removal, there are no projecting edges which could catch on the inside surface of the tool head.

4 Claims, 1 Drawing Sheet

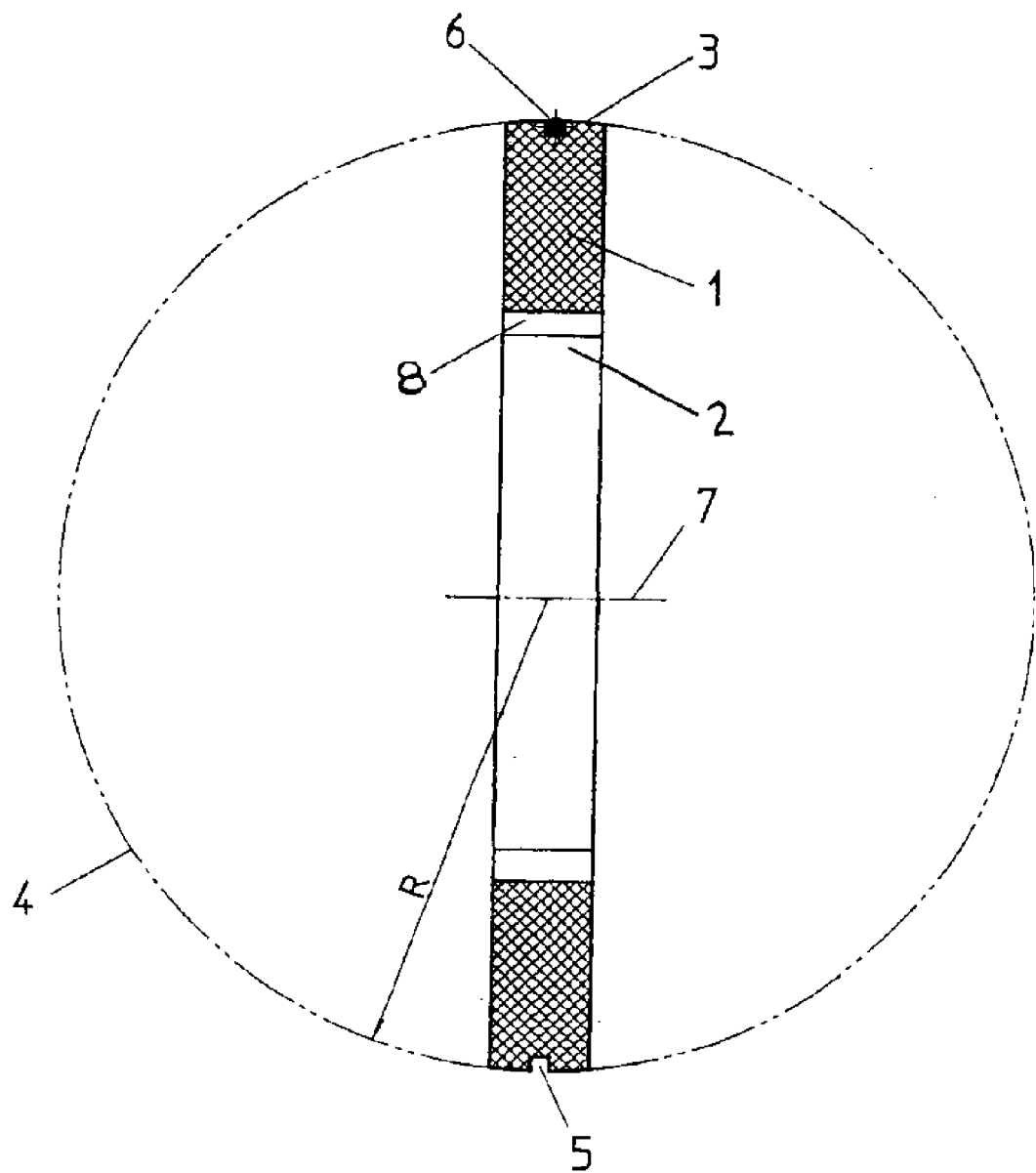

HONING WHEEL HAVING INTERNAL GEARING

FIELD OF THE INVENTION

This invention relates to a honing wheel having internal gearing for installation in a tool head equipped with a cylindrical opening.

BACKGROUND OF THE INVENTION

Such a honing wheel is used for precision machining of gear wheel-shaped workpieces. In the case of traditional honing wheels with internal gearing, the outer peripheral surface is cylindrical. The diameter of this cylindrical surface, which is concentric with the axis of rotation of the honing wheel, is slightly smaller than that of the cylindrical opening of the corresponding tool head. The honing wheel may be inserted with a push fit into the opening in the tool head and connected to it in a rotationally fixed manner by tension rings or the like. To guarantee true running of the honing wheel, the least possible clearance in the cylindrical opening of the tool head is desired.

When installing the honing wheel into the tool head and in particular when removing the honing wheel from the tool head, a slight tilting of the honing wheel, i.e., an angular deviation of the axes of the honing wheel and the tool head, is practically unavoidable. Therefore, there is the risk of the honing wheel becoming tilted in the tool head and being blocked against axial displacement. In such a case, it is possible to remove the honing wheel only by striking its rear side with a rubber mallet. However, due to the increased edge pressure of the tilted honing wheel, this may damage the inside surface of the tool head. If the operator attempts to install or remove the honing wheel by hand, there is also the risk of injury to the person due to the sharp edges of the internal gearing of the honing wheel.

To avoid these disadvantages, it is also known that the exterior peripheral surface of the honing wheel may be provided with an annular groove for an O-ring made of an elastic material. This measure makes it possible to increase the annular gap between the honing wheel and the opening in the tool head, because the deformable O-ring assumes the centering function. Experience has shown that the risk of tilting can only be reduced, but not ruled out entirely, by this measure. This is due to the poor guidance of the honing wheel, because the width of the honing wheel amounts to approximately only one-tenth of its diameter. To facilitate installation and removal of the honing wheel, there has already been a proposal for a radially subdivided tool head in which the diameter of the cylindrical opening is variable. Although this measure can prevent tilting of the honing wheel, this advantage is gained at the expense of a considerable structural complexity for the required chucking device.

The object of this invention is to create a generic honing wheel having internal gearing in which tilting during installation and removal is prevented by a simple design measure.

SUMMARY OF THE INVENTION

According to this invention, this object is achieved by the fact that the cross-sectional profile of the outer peripheral surface of the honing wheel is within a spherical enveloping surface that is concentric with the honing wheel. Due to the cross-sectional profile of the outer peripheral surface of the honing wheel according to this invention, tilting in the opening of the tool head is reliably prevented. Even if the honing wheel is tilted during installation or removal, there are no projecting edges which could catch on the inside surface of the tool head.

According to an advantageous refinement of this invention, the outer peripheral surface of the honing wheel is part of the spherical enveloping surface. Due to this profiling of the outer peripheral surface, this ensures that the honing wheel will be in contact with a ring surface on the tool head even in a tilted state. Since the honing wheel is thus always supported by the tool head over its entire circumference, this yields a uniform distribution of the supporting forces. When a traditional honing wheel having a cylindrical peripheral surface without an O-ring is tilted in the tool head, the linear contact is lost and the honing wheel is supported on the tool head only in the area of the tilting axis.

As explained above, an O-ring is not necessary per se with the honing wheel having internal gearing due to the profiling of its peripheral surface according to this invention. Likewise, the outer peripheral surface may be provided with a ring groove for an O-ring also with the honing wheel according to this invention. The fact that tilting of the honing wheel due to the profiling of its outer peripheral surface according to this invention is prevented, this allows a higher pre stress on the O-ring, because in comparison with the known honing wheel, the gap width of the honing wheel installed in the tool head may be much lower.

BRIEF DESCRIPTION OF THE DRAWING

The sole FIGURE shows an axially parallel cross section through a honing wheel having internal gearing.

DETAILED DESCRIPTION OF THE PREFERRED EMBODIMENT

This invention is explained in greater detail below on the basis of a preferred embodiment.

The honing wheel shown here consists of an annular body 1 whose interior peripheral surface 2 is provided with gearing (i.e. teeth) 8. The annular body 1 is made of a material that either has abrasive properties or has an abrasive material embedded in it. The honing wheel illustrated in the drawing has a homogenous design, but it may also have a layered design. The profiling of the outer peripheral surface of the honing wheel Is essential. As shown in the drawing, the outer peripheral surface 3 of the honing wheel is part of a spherical surface 4 which is concentric with the honing wheel and whose radius R corresponds to the outside radius of the honing wheel. In the embodiment illustrated here, the outside radius of the honing wheel amounts to 150.2 mm, and the radius of the imaginary spherical surface is 149.5 mm. The width of the honing wheel is 30 mm. The outer peripheral surface of the honing wheel is provided with a ring groove 5 into which an O-ring 6 of an elastic material may be inserted.

The honing wheel is inserted into a tool head (not shown) equipped with a cylindrical opening on a machine for precision machining of workpieces in the form of a gear wheel. In the case of a tool head for a honing wheel having the dimensions given above, the cylindrical opening would preferably have a diameter of 300 mm (tolerance H5). The honing wheel is installed into the tool head with a certain prestress on the O-ring 6. In the installed state, the honing wheel is clamped to the tool head in a rotationally fixed manner, the axis 7 of the honing wheel coinciding with that of the tool head. In installation and removal of the honing wheel, an unwanted tilting motion may also occur in addition to the axial motion, so that the axes of the honing wheel and the tool head form an angle. As indicated by the preceding discussion, the radius of curvature of the cross-sectional profile of the outer peripheral surface 3 of the honing wheel corresponds to the radius thereof. For this reason, there cannot be any edge pressure when the honing wheel is tilted relative to the axis of the tool head. Even in the tilted state, the honing wheel is in linear contact with the tool head over its entire circumference and therefore may be moved axially to the tool head without any great resistance. A very small clearance is possible, because wedging of the honing wheel in the tool head is prevented due to the special cross-sectional profile of the outer peripheral surface of the honing wheel. This permits a higher prestress on the O-ring in comparison with a honing wheel having a cylindrical outside peripheral surface. Because of the lack of risk of tilting, however, the O-ring may also be omitted entirely.

What is claimed is:

1. A honing wheel having internal gearing for installation in a tool head equipped with a cylindrical opening, said honing wheel comprising:
    an outer peripheral surface (3) having a cross-sectional profile,
    wherein the cross-sectional profile of the outer peripheral surface (3) of the honing wheel (1) is within a spherical enveloping surface (4) that is concentric with the honing wheel.

2. The honing wheel according to claim 1 wherein the outer peripheral surface (3) is part of the spherical enveloping surface (4).

3. The honing wheel according to claim 2 wherein the outer peripheral surface (3) is provided with a ring groove (5) for an O-ring (6).

4. The honing wheel according to claim 1 wherein the outer peripheral surface (3) is provided with a ring groove (5) for an O-ring (6).

* * * * *